United States Patent
Busch

(10) Patent No.: US 8,342,356 B2
(45) Date of Patent: Jan. 1, 2013

(54) DOCUMENT CONSOLE

(75) Inventor: Craig Busch, Barrie (CA)

(73) Assignee: All Source Security Container Manufacturing Corp., Ontario (CA)

( * ) Notice: Subject to any disclaimer, the term of this patent is extended or adjusted under 35 U.S.C. 154(b) by 100 days.

(21) Appl. No.: 12/751,401

(22) Filed: Mar. 31, 2010

(65) Prior Publication Data

US 2011/0240513 A1 Oct. 6, 2011

(51) Int. Cl.
*B65D 25/14* (2006.01)
(52) U.S. Cl. .......... 220/495.08; 206/366; 206/527; 220/495.05; 220/908.1; 220/908.3
(58) Field of Classification Search .......... 206/449, 206/555, 363–366, 527, 600; 220/495.01, 220/495.05, 495.06–495.08, 315, 908, 908.1, 220/908.3
See application file for complete search history.

(56) References Cited

U.S. PATENT DOCUMENTS

| | | | |
|---|---|---|---|
| 4,809,851 A * | 3/1989 | Oestreich et al. | 206/600 |
| 6,811,048 B2 * | 11/2004 | Lau | 206/600 |
| 6,991,127 B2 * | 1/2006 | Huang | 220/263 |
| 7,347,328 B2 * | 3/2008 | Hartwall | 206/600 |
| 7,600,638 B2 * | 10/2009 | Finnestad et al. | 206/366 |

OTHER PUBLICATIONS

Jake, Connor & Crew, "The eConsole" product features webpage, retrieved from http://www.jakeconnorandcrew.com/main2.cfm?id=D1D3712A-A6D2-3972-0173F860E05C6DBD, 2010 copyright, 1 page.

* cited by examiner

*Primary Examiner* — Luan K Bui
(74) *Attorney, Agent, or Firm* — Michael Best & Friedrich LLP

(57) ABSTRACT

A document console has a plastic base and a body. The body includes a top and sides. A door is interconnected to the body and is movable between open and closed positions. The base, body and door define a document receiving interior. The plastic base defines a plurality of inner and outer members which receive the side therebetween and support the sides in an upright position.

19 Claims, 8 Drawing Sheets

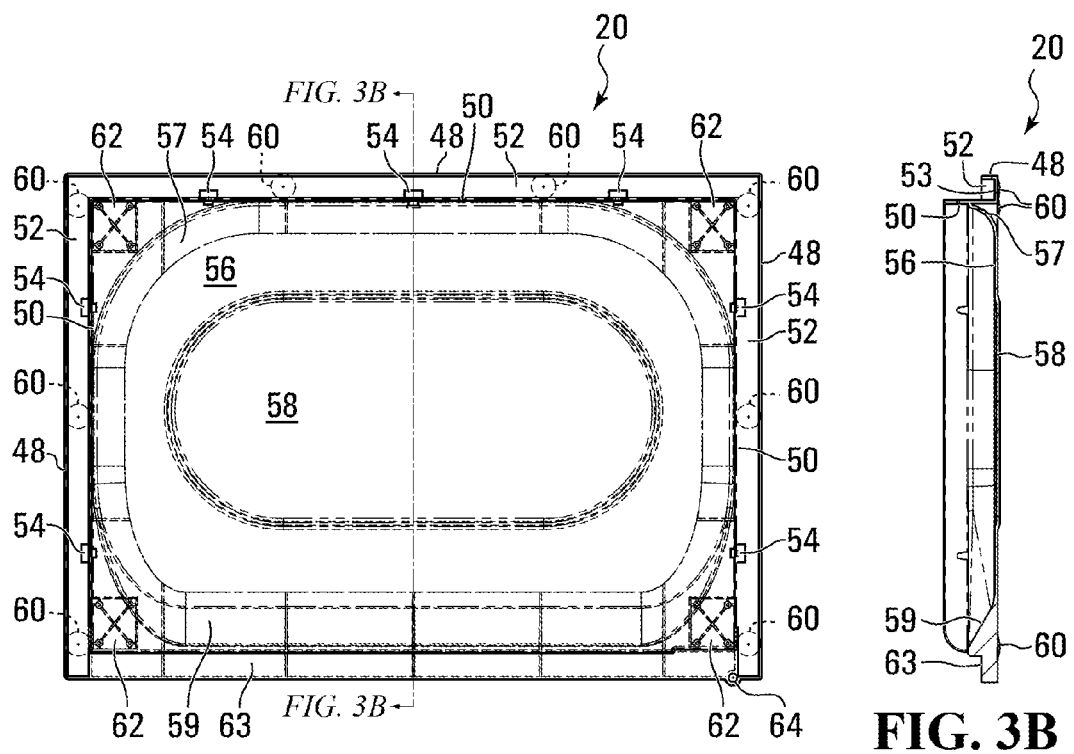
FIG. 3A
FIG. 3B
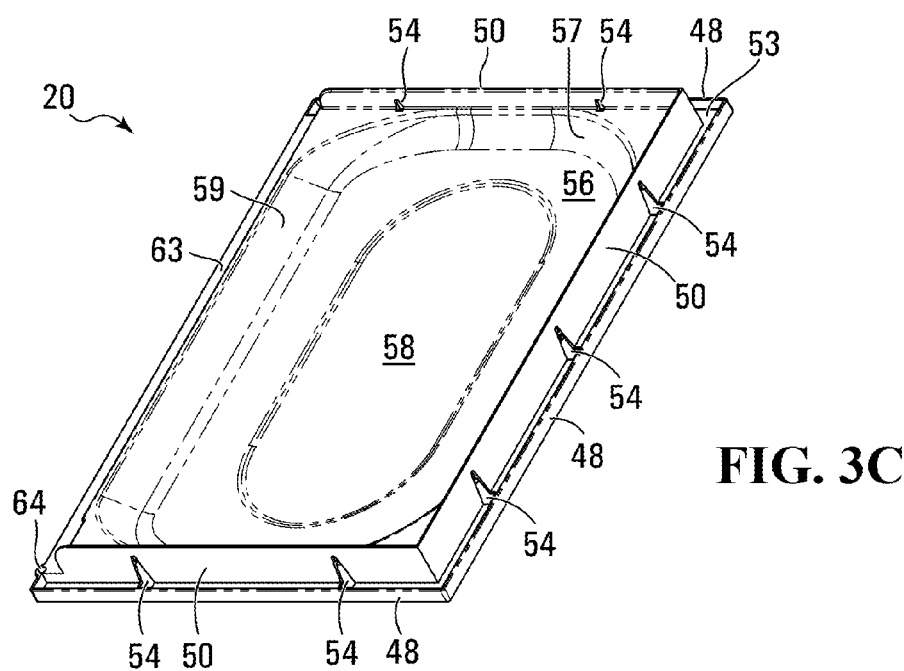
FIG. 3C

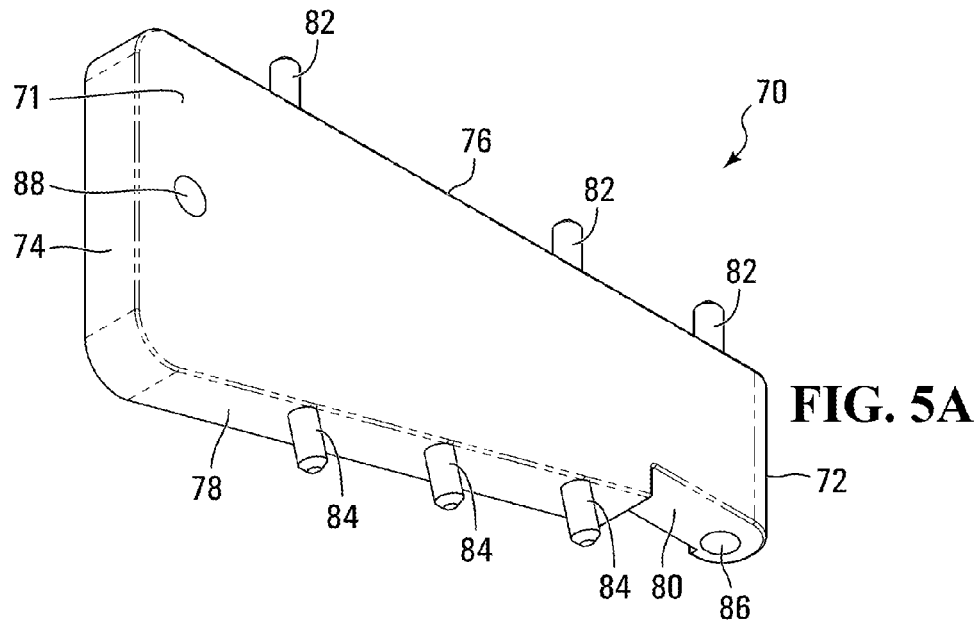
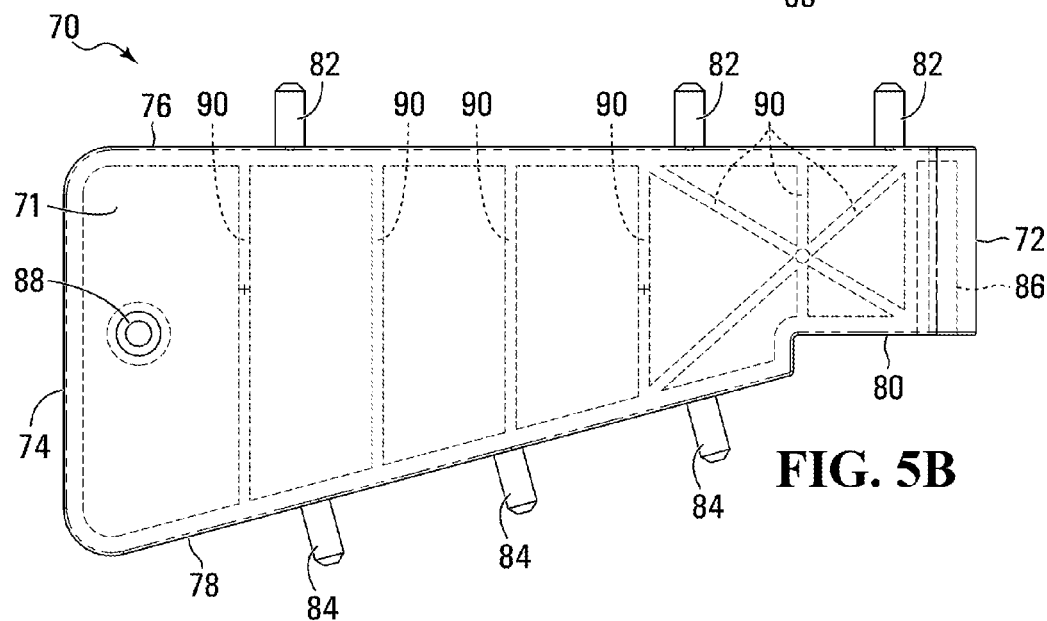
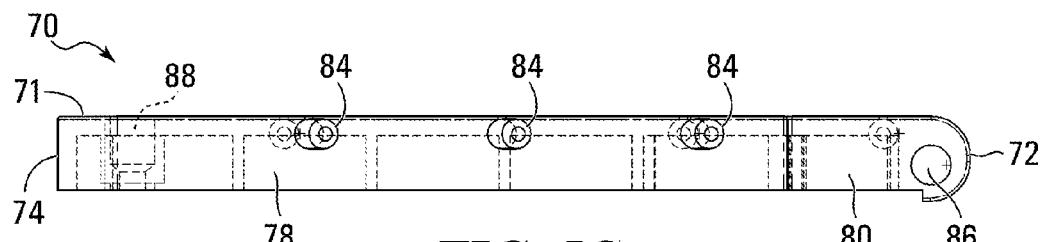

DOCUMENT CONSOLE

FIELD OF THE INVENTION

This application relates to document consoles. In particular, this application relates to document consoles which are used to store documents prior to shredding.

BACKGROUND

In many businesses, multiple draft copies of paper documents are generated in the process of developing a final version of the document. The draft copies will not be used and need to disposed of. These documents cannot simply be placed in a recycle bin because they are confidential. Instead, the documents need to be destroyed. Businesses often do not have a means of destroying documents, for example, by shredding, available at all times. Documents need to be accumulated for periodic shredding.

A document console can be used to accumulate these documents. A typical document console is a rectangular box with an opening through which documents can be inserted. The documents are accumulated inside the document console in a container, such as a bag. The console has a lockable door. The door can be opened to remove the bag so that the bag with the documents to be shredded can be carried to a shredder without the need for moving the document console.

Document consoles are often made of melamine partical board. Five sheets of the melamine partical board are screwed together with metal fasteners to form sides, a top and a bottom, and the melamine door is attached with a metal hinge. Metal hooks are used to hold the container in place inside the document console. It is sometimes necessary to move the document console, for example, when it is shipped or when it is moved within its final location. This is often done by pushing the document console across the floor. Pushing on the side the document console will tend to rotate to the sides about the base. The metal fasteners holding the melamine sides to the melamine base tend to the rip from the melamine when subject to this rotation causing the document console to break.

Also, the metal hooks, used to hold the bag in place inside the document console, leave significant gaps between the bag and the sides of the console. This allows documents to slide down between the bag and the sides so the person emptying the document console needs to inspect the document console once the bag is removed to see if any documents have been missed.

SUMMARY OF THE INVENTION

According to one aspect of the present invention, there is provided a document console comprising: a plastic base; a body comprising a top and sides; a door interconnected to the body and movable between open and closed positions; the base, body and door define a document receiving interior; wherein the plastic base defines inner and outer members which receive the sides therebetween and support the sides in an upright position.

In some embodiments, the inner and outer members comprises inner and outer walls.

In some embodiments, the inner and outer walls define a slot therebetween.

In some embodiments, each side is held by a single inner wall and a single other wall which extend substantially the length of the respective side.

In some embodiments, the plastic base is a single piece.

In some embodiments, the members define an upward opening wherein the sides sit on the base.

In some embodiments, at least one inner member for each of the sides comprises at least one opening sized to receive a fastener to fasten the respective side to the base.

In some embodiments, for each inner member, the at least one opening comprises at least two openings.

In some embodiments, each opening tapers from a wide lower end to a narrow upper end.

In some embodiments, the base further defines a lower hinge receiver.

In some embodiments, the lower hinge receiver comprises a hinge pin receiving opening.

In some embodiments, the document console includes a removable document collector wherein a top surface of the base within the inner members is shaped to support a bottom of the removable document collector.

In some embodiments, the removable document collector is flexible and the document console further comprises a plurality of hooks projecting from the inside of the sides supporting the removable document collector with substantially no gap between the inside of the sides and the removable document collector.

In some embodiments, the document console includes a document collector and a document deflector wherein the door defines an opening and the document deflector is positioned to direct documents inserted through the opening into the document collector.

In some embodiments, a document console includes a combined upper hinge receiver and document deflector support.

In some embodiments, the combined upper hinge receiver and document deflector support interconnects the door, the top, one of the sides and the document deflector.

In some embodiments, the document deflector is supported by a downwardly rearwardly angled lower surface of the combined upper hinge receiver and document deflector support.

In some embodiments, the document console includes mirror image top and bottom door hinges.

In some embodiments, the base, the combined upper hinge receiver and document deflector support and the top and bottom door hinges are each plastic molded as a single piece.

According to another aspect of the present invention, there is provided a document console base comprising a single piece plastic base having a plurality of inner and outer members shaped to receive and support a plurality of sides therebetween in an upright position.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying drawings, in which:

FIG. 3A is a top view of the base of the document console of FIG. 1;

FIG. 3B is a cross-sectional view of the base of FIG. 3A taken along the line 3B-3B of FIG. 3A;

FIG. 3C is a top perspective view of the base of FIG. 3A;

FIG. 5A is a perspective view of a combined upper hinge receiver and document deflector support of the document console of FIG. 1;

FIG. 5B is a side view of the combined upper hinge receiver and document deflector support of FIG. 5A;

FIG. 5C is a bottom view of the combined upper hinge receiver and document deflector support of FIG. 5A;

DETAILED DESCRIPTION OF THE PREFERRED EMBODIMENTS

The drawings in the application shows external features in solid lines, internal features in uniform dashed lines, and contours in irregular dashed lines.

The application relates to a document console which may have particle board sides and top but the base and the majority of hardware is molded plastic parts. Each part can be formed as a single piece. The base has members which support the sides in an upright position.

Figure 1:
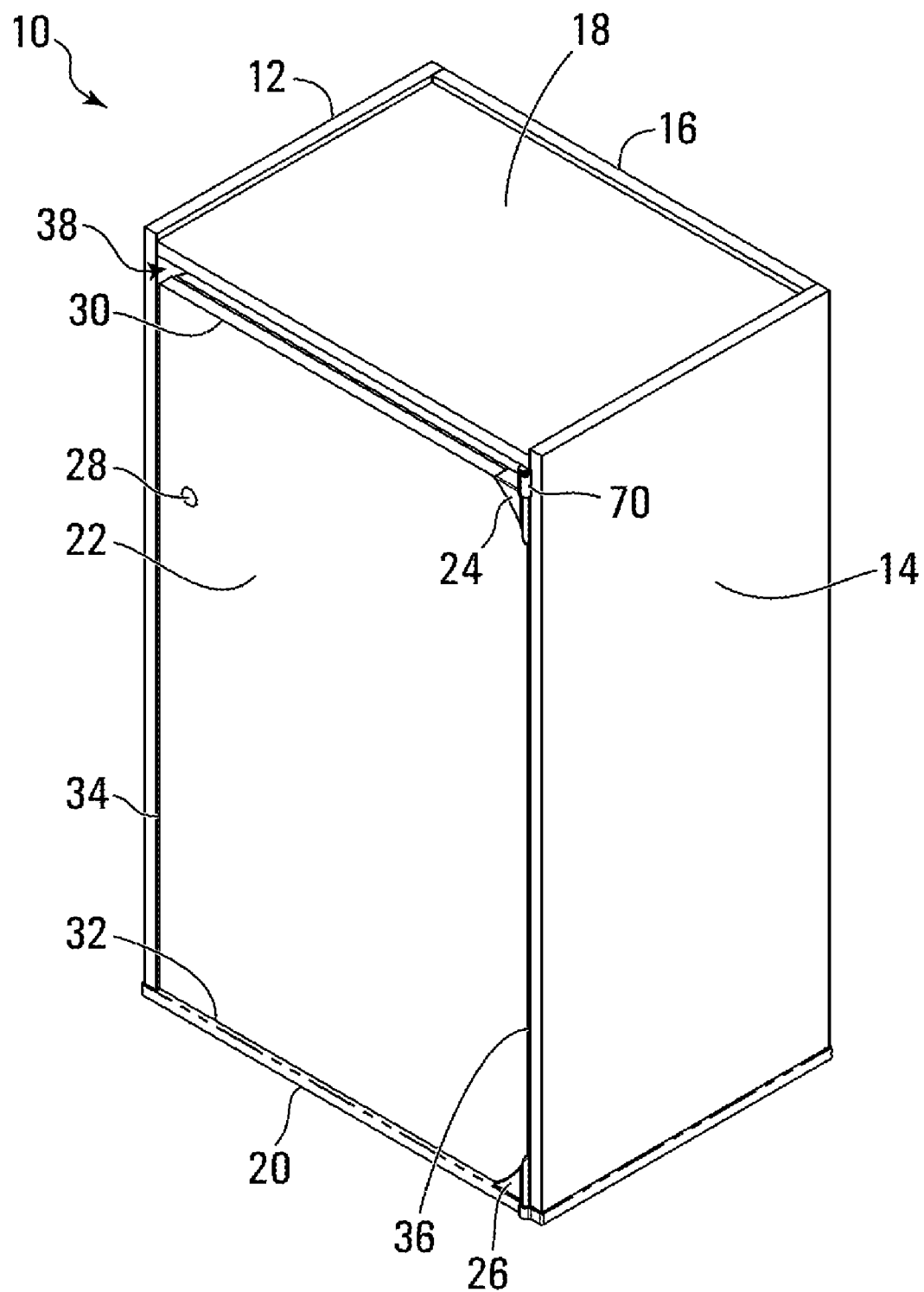
FIG. 1 is a perspective view of a document console according to an embodiment of the invention.

FIG. 1 shows a document console 10 according to an embodiment of the invention. The document console 10 has generally rectangular box shape. In this embodiment, the document console 10 has three sides, namely a left side 12, a right side 14 and a back side 16, and a top 18 which together define a body of the document console 10. The left side 12 and the right side 14 are rectangular in shape and are parallel to each other. The back side 16 is also rectangular in shape and is perpendicular to the left side 12 and the right side 14. The rear edge of the left side 12 connects to the left edge of the back side 16 and the rear edge of the right side 14 connects to the right edge of the back side 16.

In this embodiment, the top 18 is horizontal and connects along three of its edges to the top edges of the left side 12, the right side 14 and the back side 16. In order to help maintain the security of the documents within the document console 10, the connections made between the sides 12, 14 and 16 and the top 18 may be made by fasteners on the inside of the document console which cannot be tampered with from the outside. Alternatively, the sides 12, 14 and 16 and the top 18 may be connected, for example, by an adhesive without the use of fasteners or with a tongue and groove structure. In this embodiment, the sides 12, 14 and 16 and the top 18 are made of melamine partical board. However, other types of particle board or other materials such as plastics may alternatively be used.

Although this embodiment shows a rectangular document console 10, other shapes may be used, such as octagonal or oval, for example.

The document console also includes a base 20. The left side 12, the right side 14 and the back side 16 are mounted to the base 20 as will be discussed in further detail below.

The fourth side of the document console 10, is provided with a door 22. The door 22 has a top edge 30, a bottom edge 32, a left edge 34 and a right edge 36. In this embodiment, the door 22 is rotatably interconnected along the right edge 36 to the right side 14 by an upper hinge 24 and a lower hinge 26.

Although two hinges are shown in this embodiment, it will be appreciated that a single hinge, such as a piano hinge may be used. The hinge, or other flexible connection may alternatively be on the opposite side, the bottom or the top of the door. The door 22 may also be through the top 18 of the document console and may form only a portion of the top or side.

Figure 2:
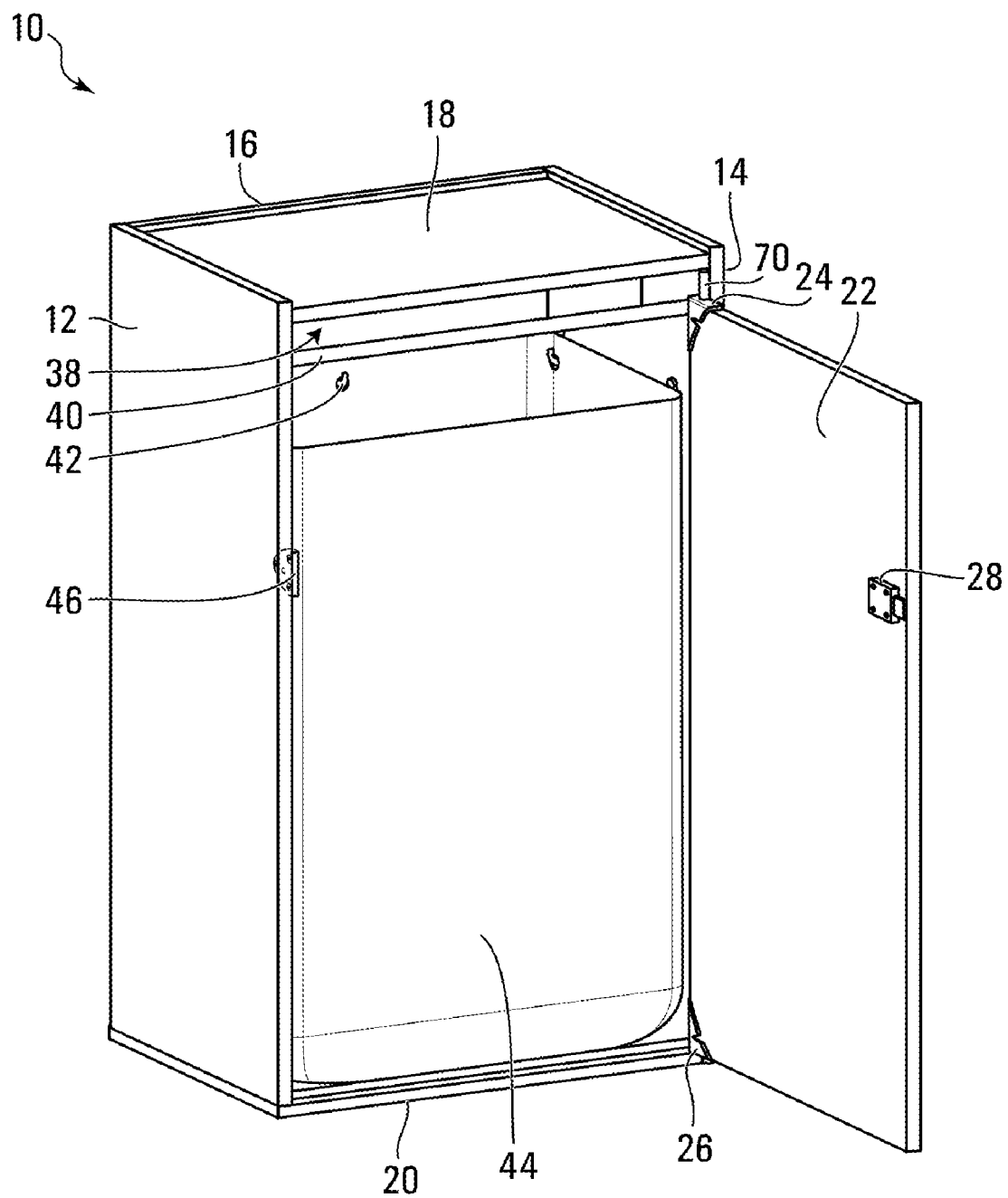
FIG. 2 is a perspective view of the document console of FIG. 1 in an open position.

The door 22 is movable between a closed position shown in FIG. 1 and an open position shown in FIG. 2. The door 22 includes a lock 28 which can be used to secure the door 22 in the closed position. The lock 28 is adjacent to the left edge 34 and the left edge 34 connects with the left side 12 in a closed position. However, the lock is not essential and may be omitted or replaced with other securing means or positioned in another location.

A gap 38 is defined between the upper edge 30 of the door 22 and the bottom surface of the top 18. The top edge 30 of the door 22 and the bottom surface of the top 18 are horizontal resulting in a rectangular opening or gap 38. Alternative an opening or gap may be provided elsewhere on the door, through the top or through one of the sides. The gap may have a movable cover such as a flap and may also be omitted in which case the door is opened to allow documents to be inserted.

FIG. 2 shows the document console 10 in an open position. The document console 10 has a hollow interior. A number of hooks 42 or other mounting measures are secured to the inside of the document console 10 on the left side 12, the right side 14 and the back side 16. These hooks 42 are, in this embodiment, all at the same height. A document collector such as a container or bag 44 is suspended inside the document console 10 by the hooks 42. The bag 44, when suspended, extends from the hooks 42 substantially to the base 20 so that the bag 44 substantially fills the interior of the document console 10 and the bottom of the bag 44 sits on the top of the base 20. This means that the volume of documents which may be collected in the document console 10 is substantially the entire interior volume of the document console 10. The bag 44 may be replaced with a different form of container, such as a plastic molded container or simply omitted with documents being accumulated directly within the document console 10. The hooks 42 may be omitted if the bag is not present or replaced with other fastening means such as snaps or a suspension from the top 18, for example.

A document deflector 40 may be fastened inside the document console 10. In this embodiment, the document deflector 40 runs between the left side 12 and the right side 14. The document deflector 40 is rectangular in shape and angles downward in a rearward direction into the document console 10 for approximately ⅓ of the depth of the document console 10. As can be seen in FIG. 2, the top of the document deflector 40 is substantially aligned with the top of the door 22. This means that when documents are inserted through the gap 38 when the door 22 is in the closed position, the documents will slide downwardly and rearwardly along the document deflector 40 and into the bag 44. The document deflector 40 helps to ensure that documents inserted through the gap 38 land in the bag 44. The document deflector 40 may be omitted, fastened to the door 22, rather than the body of the document console 10 and/or extend only partly across the document console 10.

Also attached to the inside face of the right side 14 is a door striker and lock plate 46. The door striker and lock plate 46 is fastened adjacent the front free edge of the right side 14 and aligned with the lock 28 so that the lock 28 and the door striker and lock plate 46 may cooperate to position and lock the door 22. The shape and positioning of the door striker and lock plate 46 may change depending on the type and positioning of the lock 28 or may be omitted if no lock is used.

As noted above, the left side 12, the right side 14 and the back side 16 of the document console 10 are received in and held by the base 20. FIGS. 3A, 3B and 3C depict the base 20. An outer perimeter wall 48 extends around the left side, the right side and the back of the base 20. The outer perimeter wall is a short upright wall. In this embodiment, the outer perimeter wall 48 is a continuous wall, however, in some embodiments it may comprise a series of disjointed walls or a single disjointed wall along each side or other upright members.

Inset from the outer perimeter wall 48, extending around the perimeter of the base 20, is an inner perimeter wall 50. The inner perimeter wall 50 is also an upright wall. In this embodiment, the inner perimeter wall 50 extends upward higher than the outer perimeter wall 48. In this embodiment, the inner perimeter wall 50 is a continuous wall which extends around the three sides of the document console 10. In other embodiments, the inner perimeter wall may be disjointed or other members like the outer perimeter wall 48.

The outer perimeter wall 48 and the inner perimeter wall 50 are parallel and spaced from each other such that an upwardly opening trough or slot 52 is defined between the outer perimeter wall 48 and the inner perimeter wall 50. The slot 52 has a flat bottom 53 and upright walls 48 and 50 as best seen in FIG. 3B. The spacing between the outer perimeter wall 48 and the inner perimeter wall 50, in other words, the width of the trough 52 is selected to match the thickness of the left side 12, the right side 14 and the back side 16 such that the sides 12, 14 and 16 fit within the slot 52, sit on the bottom 53 and are held in an upright position by the outer perimeter wall and the inner perimeter wall 50. In other embodiments, the walls 48 and 50 or other members may extend laterally or at an angle to hold the sides at other orientations.

A plurality of openings 54 are defined through the inner perimeter wall 50 in this embodiment. In this embodiment, the openings 54 are triangular in shape with a wider base and a narrow top. In this embodiment, there are two such openings 54 on each of the left side 12 and the right side 14 and three such openings along the back side 16. The openings 54 are provided to allow fasteners to be inserted from the inside of the inner perimeter wall 50 through the openings 54 to secure the sides 12, 14 and 16 to the inner perimeter wall 50 and thus to the base 20 from the inside of the document console 10 such that there are no external fastenings. Other numbers and shapes of openings may be used. Also, such opens and fastenings are not essential and may be omitted or replaced, for example, by an adhesive or other fastening means or system.

Internal to the inner perimeter wall 50 of the base 20 is the bag support surface 56. The bag support surface 56 is radiused down from perimeter wall 50 as can be best seen in FIG. 3B. The bag support surface 56 is a radiused surface with an extended oval shape with a concave curvature 57 around the perimeter and a contour downwards, as best seen in FIG. 3B, to a lowermost surface area 58 at the center. This allows for the base to have the required structional strength while minimizing the volume of the interior of the document console 10 occupied by the base 20 and therefore maximizing the volume of the interior of the document console 10 which may be filled with documents. On the front of the document console 10, towards the door side 22 of the base 20, there is an upwardly angled portion 59 which helps in sliding a full bag 44 out of the document console 10 as best seen in FIG. 3B. The base may have other internal contours if, for example, a molded plastic document container is used in place of a bag or no container is used. The angled portion may be omitted and the base may also be flat.

The base 20 may also include a number of foot pads 60. These foot pads 60 are positioned in this embodiment below the slot 52 around the perimeter of the base 20. The foot pads 60 and the lowermost surface area 58 together define the lowest surfaces of the base 20 on which the base 20 sits and may slide.

In this embodiment, there is also provided a castor mounting structure 62 adjacent each of the four corners just inside the slot 52 which may be used to mount castors such that the document console 10 may be wheeled from location to location.

Across the front of the base 20 is a lip 63 which provides clearance for the door 22 to swing open and closed. The lip 63 may be otherwise shaped or omitted depending on the shape and location of the door 22. Adjacent the front right corner of the base 20 on the outer side of the lip 63 is located a lower hinge pin hole 64. The lower hinge pin hole 64 is a downwardly vertically extending hole which is sized to receive the hinge pin of the lower hinge 26. The shape and location of the hinge pin hole 64 may be varied depending on the type of hinge used. The lower hinge pin hole 64 may be omitted if another flexible fastener is used.

In this embodiment, the entirety of the base 20 is a single molded part made in a single piece. The single piece base 20 is used both for the mounting and support of the sides 12, 14 and 16 as well as for mounting the door 22 through the lower hinge 26.

Figure 4A:
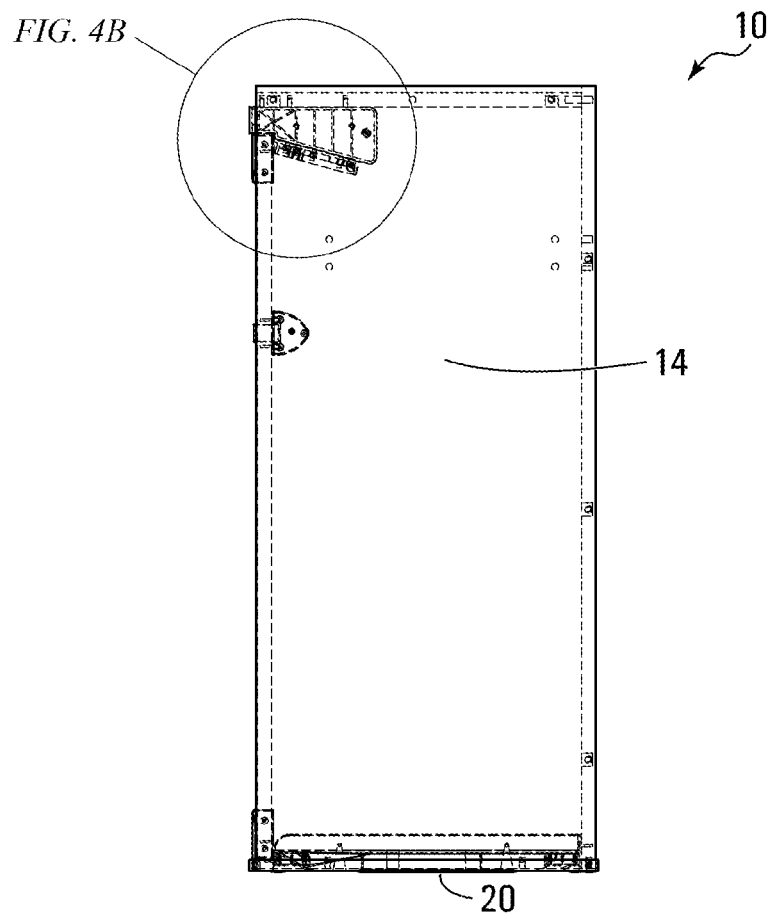
FIG. 4A is a side view of the document console of FIG. 1.
Figure 4B:
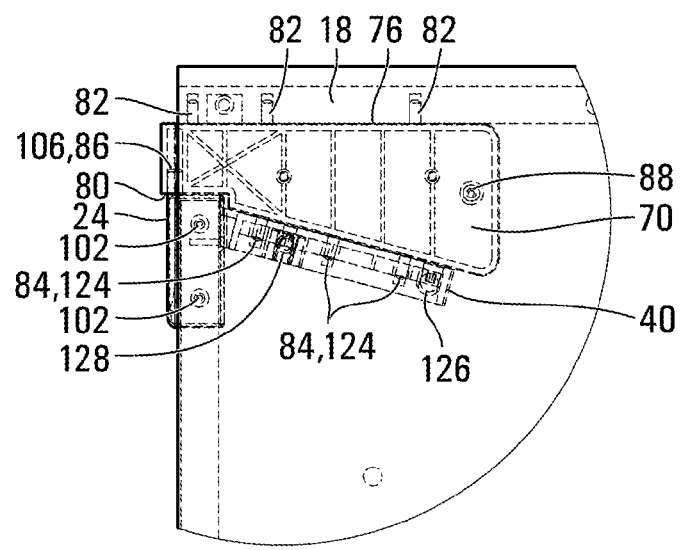
FIG. 4B is an enlarged view of detail 4B shown in FIG. 4A.

FIGS. 4A and 4B show how the upper hinge 24 and the document deflector 40 are positioned and connected. In particular, the document console 10 includes an upper hinge receiver and document deflector support 70. The upper hinge receiver and document deflector support 70 is shown in detail in FIGS. 5A to 5C. The upper hinge 24 is shown in detail in FIG. 6 and the document deflector 40 is shown in detail in FIGS. 7A and 7B.

Turning first to FIGS. 5A to 5C, the upper hinge receiver and document deflector support 70 has a support body 71 which includes a front end or hinge end 72, a rear end 74, a top side 76, a bottom side 78 and a hinge clearance surface 80. The front end 72 and the rear end 74 are parallel and are mutually perpendicular to the top side 76. The hinge clearance surface 80 is parallel to the top side 76 and also perpendicular to the front end 72 and the rear end 74. The bottom side 78 angles downward from the hinge surface 80 to the rear end 74. In this embodiment, three upper pins 82 project upward spaced along the top side 76. Similarly, in this embodiment, three lower pins 84 project outward perpendicular to the surface of the bottom side 78. In this embodiment, the pins are cylindrical but they may be of other shape and may not be identical or of identical number in other embodiments. Other cooperating protrusions and recesses may also be used.

The hinge clearance surface 80 has a hinge pin receiver hole 86 defined therethrough. The hinge pin receiver hole 86 is adjacent to the front end 72 and extends parallel to the front end 72. In this embodiment, adjacent to the rear end 74 is a fastener receiver hole 88. The fastener receiver hole 88 extends through the support body 71.

The upper hinge receiver and document deflector support 70 also includes a number of ribs 90. The ribs 90 are provided because the support 70 in this embodiment, is a single piece plastic molded part. The ribs 90 allow the support 70 to have a thin wall construction while still retaining shape. In other embodiment, the fastener receiver hole 88 and the pins 82 and 84 may be omitted and adhesive used or alternatively other numbers and configuration of holes and pins may be present. The shape of the support 70 may be vary depending on the relative shapes and positions of the upper hinge 24 and the document deflector 40.

Figure 6:
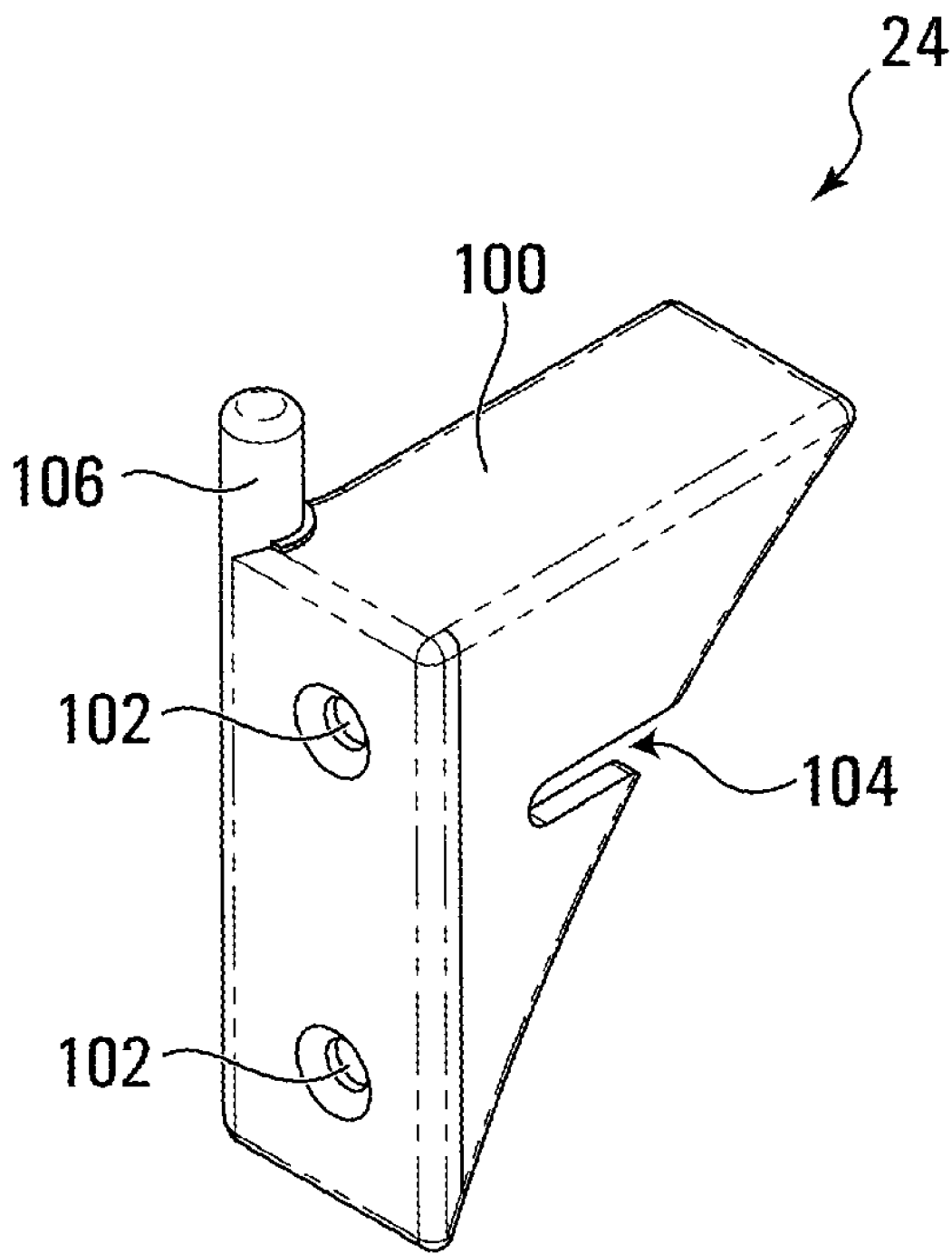
FIG. 6 is a perspective view of an upper hinge of the document console of FIG. 1.

FIG. 6 depicts the upper hinge 24. The lower hinge 26 is a mirror image of the upper hinge 24. The upper hinge 24 has a hinge body 100 with a triangular shape and a hollow interior. The hinge body 100 is thus formed to fit over the upper corner of the rectangular door 22. Two holes are provided through the body 102 in this embodiment to allow the hinge 24 to be fastened to the vertical edge of the door 22. The number and positioning of the holes 102 is not essential and they may be omitted if an adhesive is instead used. Also, as an alternative means of using a fastener, a slot 104, is provided. The slot 104 may be used, for example, to mount a replacement hinge 24 if the area of the door 20 beneath the holes 102 of the replacement hinge 24 has already been drilled and cannot again be used for fastening.

Projecting upward from the body 100 of the hinge 24 is a hinge pin 106. In this embodiment, the hinge pin is cylindrical in shape and size to fit within the hinge pin receiver hole 86 of the support 70.

Figure 7A:
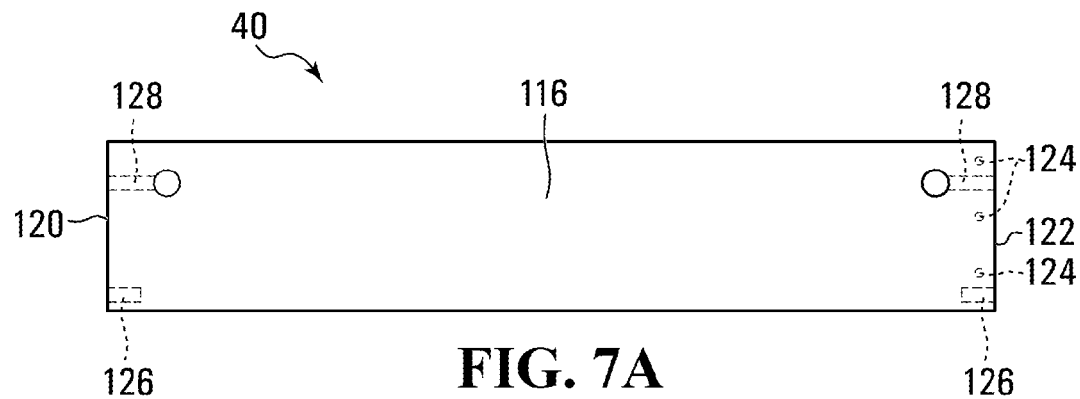
FIG. 7A is a bottom view of a document deflector of the document console of FIG. 1.
Figure 7B:
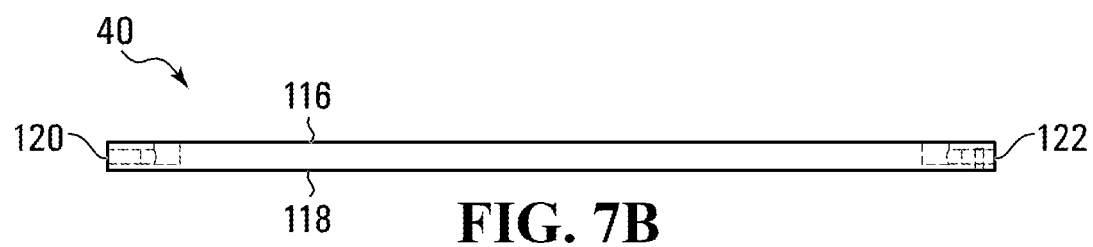
FIG. 7B is a side view of the document deflector of FIG. 7A.
Figure 7C:
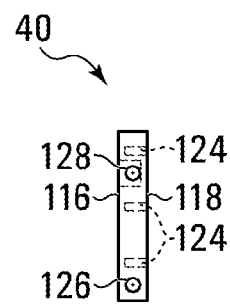
FIG. 7C is an end view of the document deflector of FIG. 7A.

Turning to FIGS. 7A and 7B, these figures depict the document deflector 40 which is a rectangular member such as a piece of a melamine partical board. In this embodiment, the document deflector 40 has a bottom side 116, a top side 118, a left side 120 and a right side 122. Adjacent the right side 122 are defined three pin receiving holes 124. The pin receiving holes 124 are blind holes drilled from the top side 118 and are perpendicular to the top side 118. The pin receiving holes 124 are sized and spaced to mate with the lower pins 84 of the upper hinge receiver and document deflector support 70. Additionally, in this embodiment, end holes 126, 128 may be defined extending inwardly from the left side 120 and the right side 122 to receive dowels or other fastening means. It will be understood that these holes may be of other numbers and configuration or omitted and replaced with adhesive or other fastening means. The shape of the document deflector 40 also need not be rectangular and need not be formed with melamine partical board, for example, the document deflector may be a curved plastic molded part.

Returning to FIGS. 4A and 4B, these figures show how the upper hinge receiver and document deflector support 70, the document deflector 40 and the upper hinge 24 are mounted. In particular, the upper pins 82 of the hinge receiver and document deflector support 70 are received within complementary holes defined through the bottom surface of the top 18. The top side 76 of the upper hinge receiver and document deflector 70, thus rests against the bottom side of the top 18. The upper hinge receiver and document deflector support 70 may be fastened to the right side 14 by a fastener through the fastener receiver hole 88. The document deflector 40 is pushed into position by pushing the pin receiving holes 124 onto the lower pins 84. The document deflector 40 may additionally be held by dowels extending through the end holes 126, 128 and complimentary holes in the left side 12 and the right side 14 or by other fastening means. The upper hinge 24 may be screwed to the upper right corner of the door 20 through the fastening holes 102 or otherwise fastened to that upper corner. The hinge pin 106 of the hinge 24 is received within the hinge pin receiver hole 86 of the upper hinge receiver and document deflector support 70.

The lower hinge 26 is similarly mounted to the lower right corner of the door 22 and the hinge pin received within the lower hinge pin hole 64. The door 22 is rotatable about an axis defined by the thus aligned upper and lower hinges 24 and 26.

The hinge surface 80 abuts the top of the upper hinge 24. The space between the hinge surface 80 and the top side 76 of the upper hinge receiver and document deflector body 70 defines the width of the gap 38. When documents are inserted through the gap 38 they slide down along the document deflector 40 and into the bag 44 within the document console 10. The support 70 may be replaced with separate hinge and deflector supports or may be omitted depending on the configuration of the document console 10.

Figure 8:
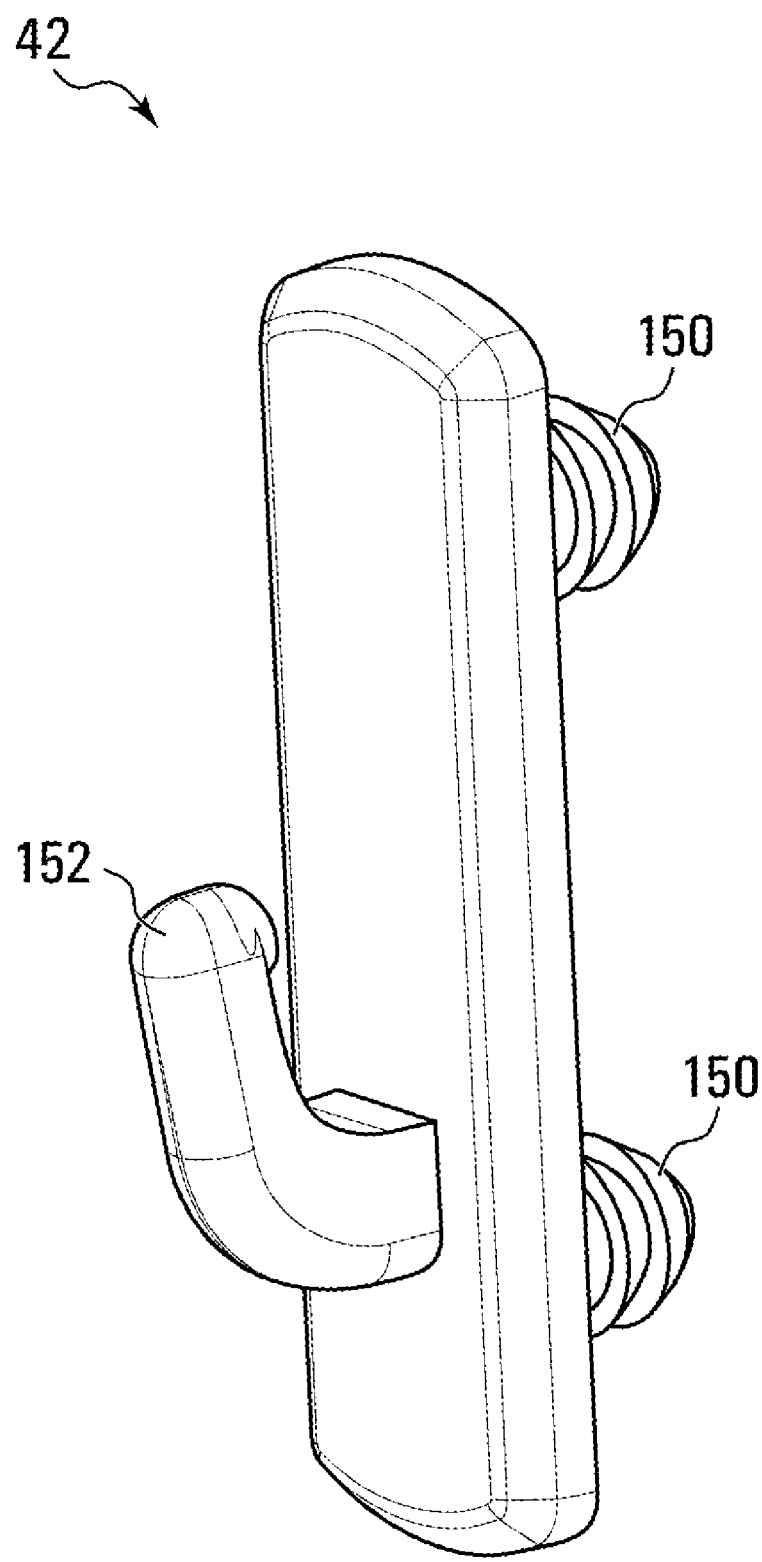
FIG. 8 is a perspective view of a hook of the document console of FIG. 1.

FIG. 8 shows a detailed view of a bag hook 42. The bag hook 42 includes rear projections 150 and a front hook 152. The bag hook 42 is of low profile and can be mounted by inserting the rear projections 150 through complimentary holes on the inner surface of the sides 12, 14 and 16 or may be, for example, glued into place. The front hook 152 is low profile such that a minimal space is provided between the side to which the bag 44 is mounted and the inner surface of the document console 10 when a hole in the bag 44 is hooked over the front hook 152. A combination of this very close spacing between the bag 44 and the sides 12, 14 and 16 as well as the document deflector 40, which angles documents into the bag 44, together can help ensure that documents loaded into the document console are all directed into the bag 44.

It will be noted that the base 20, the upper hinge receiver and document deflector support 70, the hinges 24 and 26, the lock plate 46, and the hook 42 may all be plastic molded parts which are molded each as a single part. These parts may provide higher durability and less chance of breakage of the document console 10. When assembled, the document console 10, if pushed, can slide across the floor on the base, in particular, on the feet 60 and the lower surface 58 without risk of fasteners tearing from sides 12, 14 and 16. The walls 48 and 50 provide lateral support to the sides 12, 14 and 16. The upper hinge receive and document deflector support 70 allow for optimum positioning of the document deflector 40 and the door 22 through the hinge 24. The hooks 42 and the concave top surface 56 of the base 20 allow for optimum positioning of the bag within the document console 10 to allow for maximum interior space of the document console 10 with a minimum chance of documents not falling within the bag.

Although this embodiment shows plastic molded parts and melamine parts, the parts may be formed with other materials. The precise number and location of the holes and pins described are exemplary and may be omitted as noted above.

What has been described is merely illustrative of the application of the principles of the invention. Other arrangements and methods can be implemented by those skilled in the art without departing from the spirit and scope of the present invention.

The invention claimed is:

1. A document console comprising:
a plastic base;
a body comprising a top and sides;
a door interconnected to the body and movable between open and closed positions;
wherein:
the base, body and door define a document receiving interior for securely accumulating documents;
the plastic base defines inner and outer members which receive the sides therebetween and support the sides in an upright position; and
at least one inner member for each of the sides comprises at least one opening sized to receive a fastener to fasten the respective side to the base.

2. The document console of claim 1 wherein the inner and outer members comprise inner and outer walls.

3. The document console of claim 2 wherein the inner and outer walls define a slot therebetween.

4. The document console of claim 3 wherein each side is held by a single inner wall and a single other wall which extend substantially the length of the respective side.

5. The document console of claim 1 wherein the plastic base is a single piece.

6. The document console of claim 1 wherein the members define an upward opening wherein the sides sit on the base.

7. The document console of claim 1 wherein for each inner member, the at least one opening comprises at least two openings.

8. The document console of claim 7 wherein each opening tapers from a wide lower end to a narrow upper end.

9. The document console of claim 1 wherein the base further defines a lower hinge receiver.

10. The document console of claim 9 wherein the lower hinge receiver comprises a hinge pin receiving opening.

11. The document console of claim 1 further comprising a removable document collector wherein a top surface of the base within the inner members is shaped to support a bottom of the removable document collector.

12. The document console of claim 10 wherein:
the lower hinge receiver further comprises a hinge clearance surface protruding from one of the outer members, and
the hinge pin receiving opening is defined through the hinge clearance surface.

13. The document console of claim 12 further comprising a removable molded document collector that substantially fills the interior of the document console, and wherein the open position of the door permits removal of said document collector.

14. A document console comprising:
a plastic base;
a body comprising a top and sides;
a door interconnected to one of the sides and movable between open and closed positions;
a document collector and a document deflector; and
a combined upper hinge receiver and document deflector support;
wherein:
the base, body and door define a document receiving interior;
the plastic base defines inner and outer members which receive the sides therebetween and support the sides in an upright position; and
the door defines an opening and the document deflector is positioned to direct documents inserted through the opening into the document collector.

15. The document console of claim 14 wherein the combined upper hinge receiver and document deflector support interconnects the door, the top, one of the sides and the document deflector.

16. The document console of claim 15 wherein the document deflector is supported by a downwardly rearwardly angled lower surface of the combined upper hinge receiver and document deflector support.

17. The document console of claim 16 further comprising mirror image top and bottom door hinges.

18. The document console of claim 17 wherein the base, the combined upper hinge receiver and document deflector support and the top and bottom door hinges are each plastic molded as a single piece.

19. A document console comprising:
a plastic base;
a body comprising a top and sides;
a door interconnected to the body and movable between open and closed positions, wherein the base, body and door define a document receiving interior and wherein the plastic base defines inner and outer members which receive the sides therebetween and support the sides in an upright position;
a flexible removable document collector wherein a top surface of the base within the inner members is shaped to support a bottom of the removable document collector; and
a plurality of hooks projecting from inside of the sides supporting the removable document collector with substantially no gap between the insides of the sides and the removable document collector.

* * * * *